United States Patent [19]

Uchikawa et al.

[11] 3,864,141

[45] Feb. 4, 1975

[54] PROCESS FOR REGULATING SETTING TIME OF HYDRAULIC CEMENT

[75] Inventors: Hiroshi Uchikawa, Funabashi; Shunichiro Uchida, Chiba, both of Japan

[73] Assignee: Onoda Cement Co., Ltd., Onoda-shi, Yamaguchi-ken, Japan

[22] Filed: July 6, 1973

[21] Appl. No.: 377,112

Related U.S. Application Data

[62] Division of Ser. No. 253,352, May 15, 1972.

[52] U.S. Cl. .................................. 106/315, 106/90
[51] Int. Cl. ........................ C04b 13/24, C04b 7/02
[58] Field of Search ........................... 106/90, 315

[56] References Cited
UNITED STATES PATENTS

| | | | |
|---|---|---|---|
| 1,214,910 | 2/1917 | Goddard | 106/90 |
| 1,805,104 | 5/1931 | Reed-Lewis | 106/90 |
| 2,508,480 | 5/1950 | Ainsworth | 106/90 |
| 3,054,687 | 9/1962 | Montgomery et al. | 106/315 |
| 3,628,973 | 12/1971 | Greening et al. | 106/315 |
| 3,664,854 | 5/1972 | Kokuta | 106/315 |

OTHER PUBLICATIONS

Taylor; W. H. W. H. Concrete Tech. and practice, Amer. Elsevier Pub. Co., New York. 1965. pp. 184–185.

*Primary Examiner*—Delbert E. Gantz
*Assistant Examiner*—James W. Hellwege
*Attorney, Agent, or Firm*—Oblon, Fisher, Spivak, McClelland & Maier

[57] ABSTRACT

The present invention is an improved one of U.S. Pat. No. 3,782,992 and relates to a process for regulating setting time of hydraulic cement which comprises clinker containing 5 – 60 percent by weight of $11CaO\cdot7Al_2O_3\cdot CaX_2$, more than 5 percent by weight of $3CaO\cdot SiO_2$, anad further $2CaO\cdot SiO_2$ solid solution and $4CaO\cdot Al_2O_3\cdot Fe_2O_3$; anhydrite with or without hemihydrate; at least one selected from the group consisting of sugars, sodium hydrogen carbonate, water-soluble phosphates, carboxylic acids, silicofluroides, sodium silicates, ligninsulfonate, sulfuric esters of higher alcohol and alkylsulfonates, whereby the anhydrite is contained in an amount that $Al_2O_3/SO_3$ weight ratio of $Al_2O_3$ in the clinker and $SO_3$ in the anhydrite is 0.7 – 1.8 and hemihydrate is contained less than 5 percent by weight based on $SO_3$.

7 Claims, 4 Drawing Figures

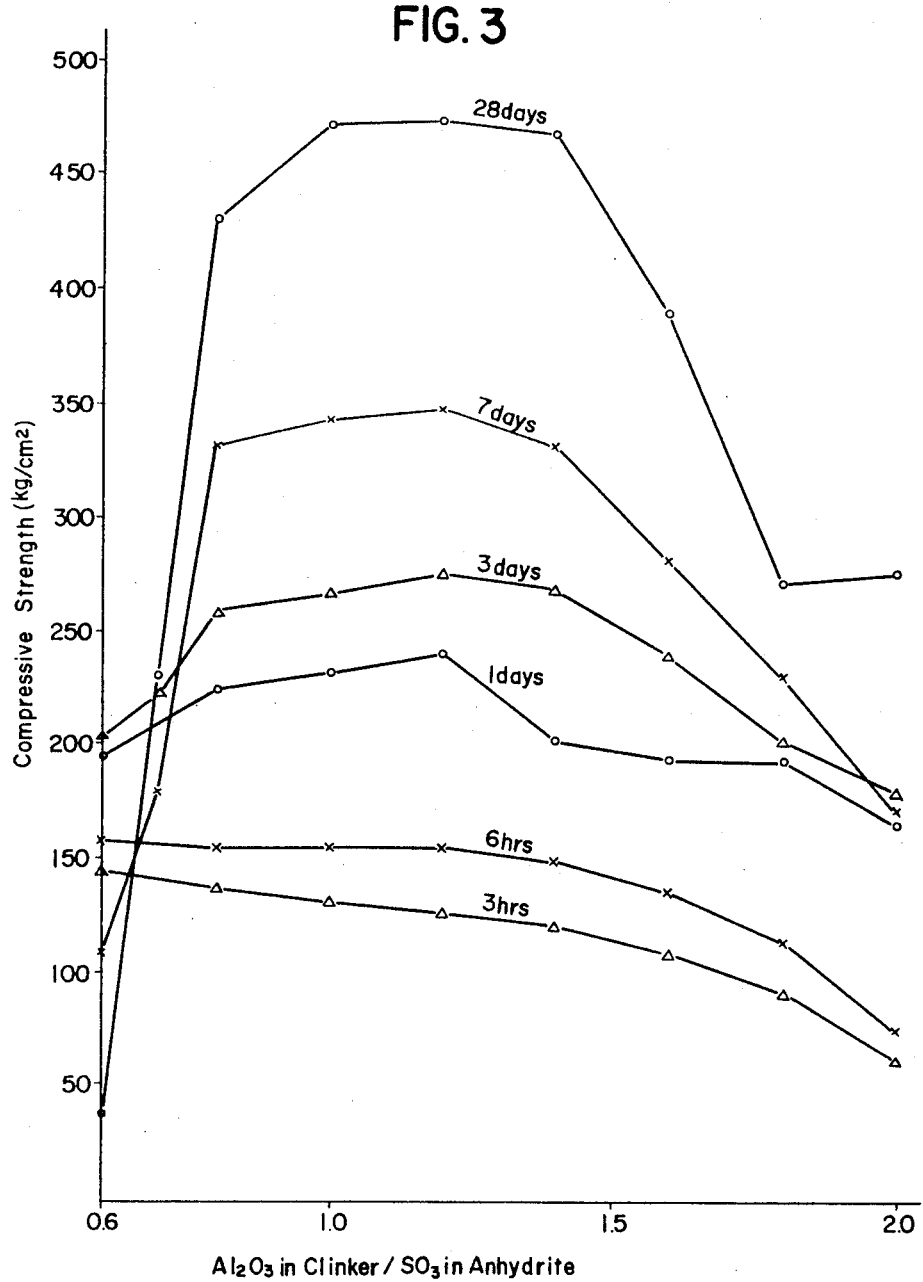

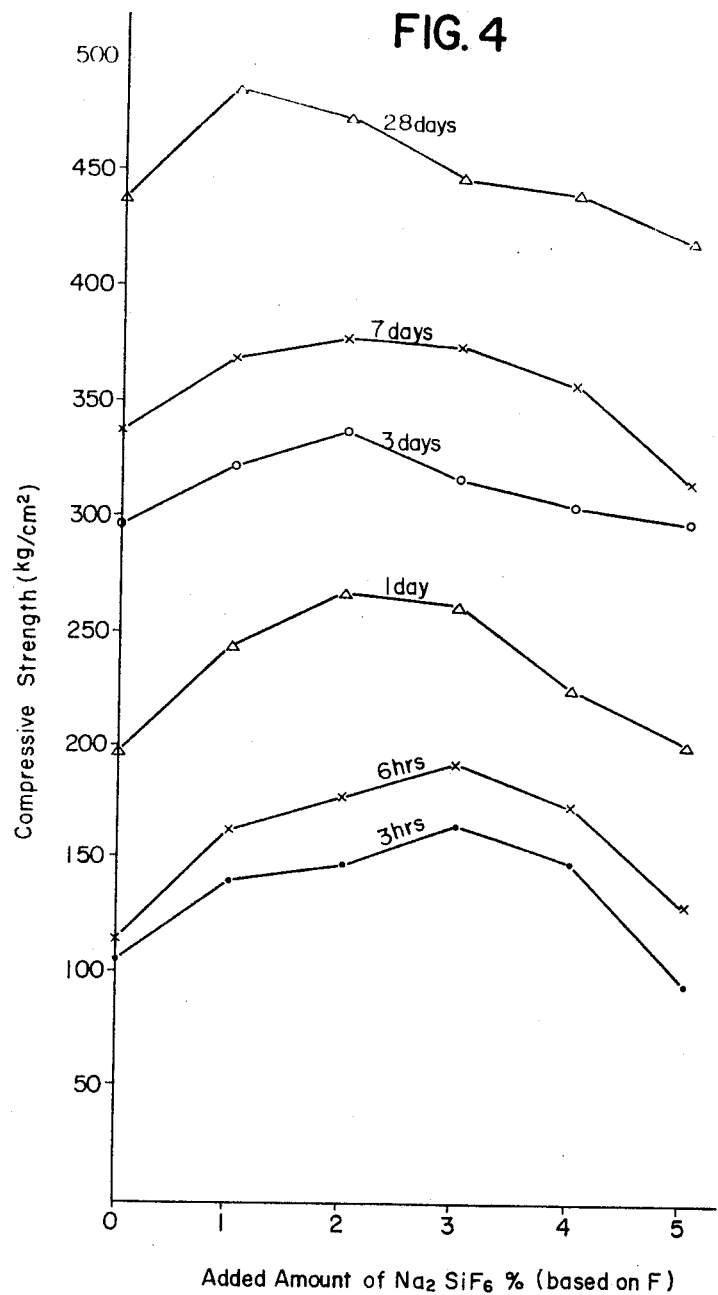

PROCESS FOR REGULATING SETTING TIME OF HYDRAULIC CEMENT

This is a division, of application Ser. No. 253,352, filed May 15, 1972.

The present invention relates to a process for suitably regulating setting time of hydraulic cement which has high strength at the initial and later stages. The initial and later stages means less than 6 hrs and more than 3 days respectively, in the present invention.

When the mixed raw materials comprising calcareous, silicious and aluminous material as well as a small amount of halide such as calcium fluoride, calcium chloride, etc., are sintered, the initial crystallization region of calcium aluminate ($3CaO.Al_2O_3$) is extremely narrowed and the clinker obtained will not contain calcium aluminate, and contains $11CaO.7Al_2O_3.CaX_2$ (X represents a halogen atom) as a stable phase, and thus the clinker containing $11CaO.7Al_2O_3.CaX_2$ as a stable phase, as well as $3CaO.SiO_2$, $2CaO.SiO_2$, $4CaO.Al_2O_3.Fe_2O_3$, etc. is obtained.

$11CaO.7Al_2O_3.CaX_2$ component has a high hydration activity and a greater hardenability, so it is effective that hemihydrate (or hemihydrate gypsum) is added to the clinker containing $11CaO.7Al_2O_3.CaX_2$ component for retarding the setting time thereof and also insoluble anhydrite (or insoluble anhydrite gypsum) is added to the clinker containing $11CaO.7Al_2O_3.CaX_2$ for developing strength in the initial and the later stages. However, as disclosed by U.S. Pat. No. 3,782,992, we have found that if at least one of sulfates, nitrates and chlorides of potassium, sodium, magnesium, calcium, aluminium and ammonium (excepting $CaSO_4.1/2H_2O$), is added to the clinker as a substitute of hemihydrate, setting time of cement thus obtained is retarded and the hardened matter has excellent strength, and that if the above-mentioned additive is added to the clinker with anhydrite and hemihydrate, setting time of cement thus obtained is retarded and the cement have good workability and more excellent strength development property at the early and the later stages than that of the former cement. The early stage means between 6 hrs and 3 days in the present invention.

An object of the present invention is to provide a process for regulating setting time of hydraulic cement comprising $11CaO.7Al_2O_3.CaX_2$ by using an additive other than the above-mentioned additives.

Another object of the present invention is to provide a process for preparing cement which has good workability and high initial strength and a hardened material thereof has high strength for a long period of time.

We found that in addition to the above-mentioned additive, sodium hydrogen carbonate, water-soluble phosphates, silicofluorides, sodium silicates, sugars, carboxylic acids, ligninsulfonates, sulfuric esters of higher alcohol or alkylsulfonates is effective.

The present invention can be more fully understood from the following detailed description when taken in conjunction with reference to the accompanying drawings, in which:

FIG. 3 shows the relation between the compressive strength of cement mortar comprising the clinker and $Al_2O_3/SO_3$ ratio of $Al_2O_3$ in the clinker and $SO_3$ in anhydrite.

FIG. 4 shown the relation between the compressive strength of cement mortar comprising the clinker and the added amount of sodium silicofluoride (based on F).

Bauxite, quick lime, and copper slag as well as fluorite were ground, respectively, and mixed so as to obtain clinker having a composition as shown in Table 1. The resulting mixture was shaped and sintered at 1,320° – 1,330°C. The thus obtained clinker was ground to powder having Blaine specific surface area of 3,700 cm²/g. The composition of the clinker analized by X - ray diffraction analysis are shown in Table 1.

Table 1

| Chemical composition (%) | | | | | | Mineral composition (%) | |
|---|---|---|---|---|---|---|---|
| $SiO_2$ | $Al_2O_3$ | $Fe_2O_3$ | CaO | MgO | Total | $C_{11}A_7.CaF_2$ | $C_3S$ |
| 17.7 | 12.9 | 2.4 | 62.3 | 0.6 | 95.6 | 23 | 52 |

Natural gypsum having a composition of Table 2 was used to produce the following products.

Table 2

| ig.loss % | $SiO_2+R_2O_3$ % | CaO % | $SO_3$ % | Total % |
|---|---|---|---|---|
| 21.1 | 1.8 | 31.3 | 45.6 | 99.8 |

Hemihydrate: The natural gypsum of Table 2 was kept at 160°C for 3 hours and was cooled and ground to powder having a Blaine specific surface area of 5,000 cm²/g.

Insoluble anhydrite: The natural gypsum of Table 2 was kept at 800°C in an electric furnace for 1 hour, and was cooled and ground to powder having a Blaine specific surface area of 4,200 cm²/g.

These gypsum products were used after the chemical form thereof was identified by thermal analysis such as diffrential thermal analysis or thermobalance analysis.

In order to determine the relation between the amount of galactose to be used and the setting time or the compressive strength after setting of cement mortar, the setting time and the compressive strength of mortar were determined with respect to cement in which galactose was mixed alone and in which anhydrite was mixed in combination with galactose in an amount that $Al_2O_3/SO_3$ ratio of $Al_2O_3$ in the clinker and $SO_3$ in anhydrite is 1.2 by weight.

The initial and final setting time of mortar are determined in accordance with the test method for setting of paste described in JIS R 5201, using a sample of which the cement/standard sand (yielded in TOYOURA) ratio is 1 : 2 by weight, and water/cement ratio is 0.55 by weight and the strength of mortar is determined in accordance with the test method described in JIS R 5201.

Figure 1:
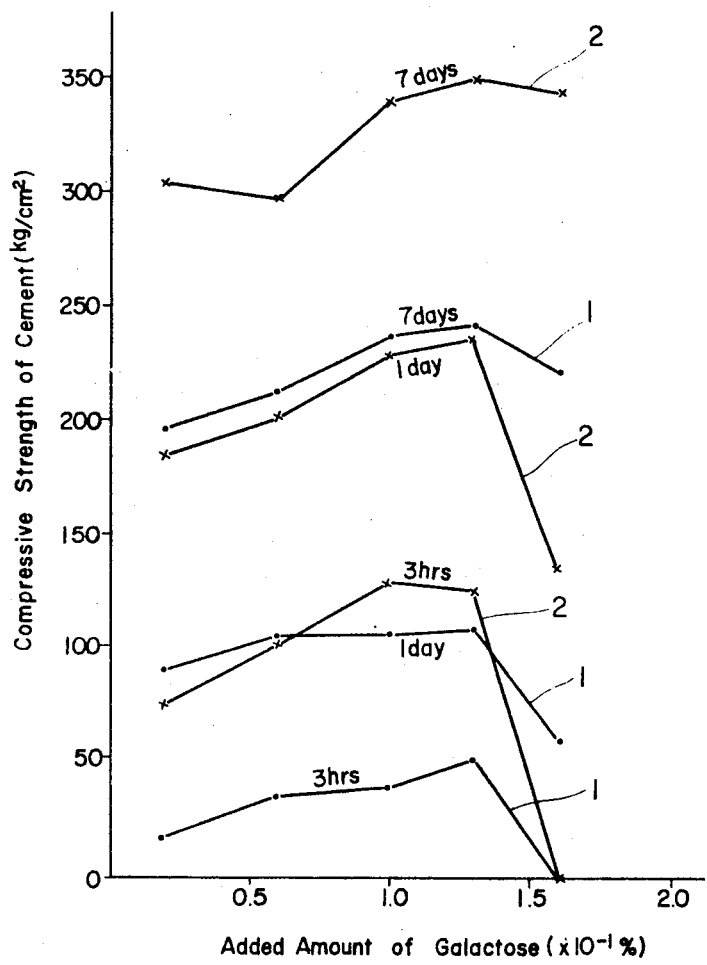
FIG. 1 shows the relation between the compressive strength of cement mortar comprising the clinker and the added amount of galactose when anhydrite is added or is not added.
Figure 2:
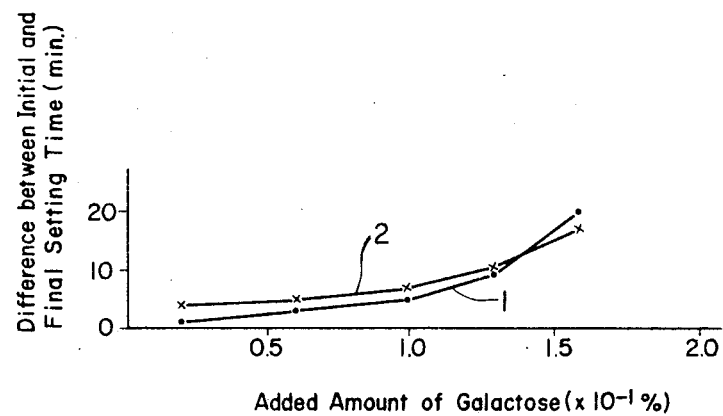
FIG. 2 shows the relation between a difference between the initial and the final setting time or the setting time of the cement mortar as used in FIG. 1 and the added amount of galactose.
Figure 2:
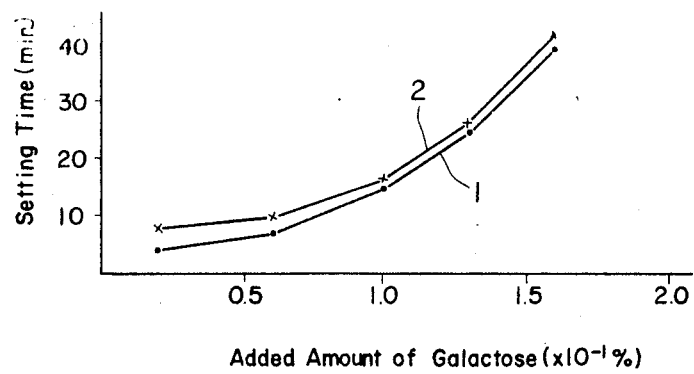

The results are shown in FIG. 1 and FIG. 2. In these figures, numerals 1 and 2 show the cases which anhydrite is not added and is added, respectively.

It has been found from these results that when galactose is used alone, the setting time of mortar is retarded and the compressive strength of mortar in the initial stage increase with increase of the amount of galactose, but when galactose is added more than a fixed amount, the compressive strength in the initial stage is lowered.

In contrast with the above-mentioned, it has been found that when anhydrite is used in combination with galactose, although the setting time is retarded more than when galactose is used alone, strengths in the initial and later stage develop remarkably. This facts tell that existence of anhydrite and galactose is essential for realization of extremely high initial and later strength.

It has been found also that when an additive other than galactose, such as sodium hydrogen carbonate, water-soluble phosphates, carboxylic acids, silicofluorides, sodium silicates, ligninsulphonates, higher alcohol sulfuric esters or alkylsulfonate is used, a similar result as the above-mentioned is obtained.

The relation between the compressive strength of mortar and the added amount of anhydrite was studied with respect to cement in which sodium fluosilicate is added 1.2 percent by weight based on F and anhydrite is added at various $Al_2O_3/SO_3$ weight ratio of $Al_2O_3$ in the clinker and $SO_3$ in anhydrite to the above-mentioned clinker. These results are shown in FIG. 3.

As has been observed in the above FIG. 3, it is preferable to add insoluble anhydrite to the clinker in an amount that the ratio of $Al_2O_3$ in the clinker and $SO_3$ in the anhydrite, that is, $Al_2O_3/SO_3$ ratio is between 0.7 and 1.8.

It has been found also that when an additive other than sodium silicofluoride is used, a similar result as the above-mentioned is obtained as shown by the addition of sodium silicofluoride.

The relation between the compressive strength of mortar and the added amount of sodium silicofluoride was studied with respect to cement in which various amounts of sodium silicofluoride are added to the mixture of 13 percent by weight of anhydrite and 2 percent by weight of hemihydrate. These results are shown in FIG. 4.

As had been observed in the above FIG. 4, the compressive strength of the mortar increase gradually with increase of the added amount of sodium silicofluoride and decreases gradually after addition of a fixed amount of sodium silicofluoride.

It has been found also that the initial and later strength of mortar increase with addition of hemihydrate to percent mixture of anhydrite and sodium silicofluoride as compared FIG. 3 with FIG. 4.

Table 3 shows the relation between the setting time and the compressive strength of mortar when 15 percen by weight of anhydrite or a mixture of 13 percent by weight of anhydrite and 2 percent by weight of hemihydrate are added to the clinker shown in Table 1 and the above-mentioned additives are added to the thus obtained cement.

Table 3

| Clinker | Anhydrite | Hemihydrate | Additive | Setting time of mortal (min.) Initial | Final | Compressive strength of mortal (kg/cm²) 3 hrs. | 6 hrs. | 1 day | 3 days | 7 days | 28 days |
|---|---|---|---|---|---|---|---|---|---|---|---|
| 85 | 13 | 2 | — | 17 | 25 | 105 | 112 | 196 | 295 | 340 | 436 |
| 85 | 15 | — | Cane sugar 0.3 | 14 | 23 | 80 | 124 | 197 | 310 | 363 | 445 |
| 85 | 13 | 2 | Cane sugar 0.3 | 20 | 28 | 137 | 148 | 256 | 288 | 375 | 513 |
| 85 | 15 | — | Sodium dihydrogen phosphate 0.3 (based on $P_2O_5$) | 19 | 24 | 122 | 135 | 212 | 286 | 346 | 446 |
| 85 | 13 | 2 | do. | 24 | 30 | 133 | 156 | 240 | 310 | 357 | 475 |
| 85 | 15 | — | Adipic acid 0.2 | 14 | 18 | 115 | 127 | 240 | 290 | 343 | 450 |
| 85 | 13 | 2 | do. | 23 | 30 | 102 | 162 | 263 | 325 | 384 | 476 |

As has been observed in the above, when hemihydrate is added to the clinker, the initial and later strength of the thus obtained cement increase.

The relation between the setting time or the compressive strength, and amount of used additives was studied with respect to clinkers containing 5 – 60 percent of $11CaO.7Al_2O_3.CaX_2$ and more than 5 percent of $3CaO.SiO_2$ and further $2CaO.SiO_2$, $4CaO.Al_2O_3$, etc. and the results were similar as the results obtained by the above-mentioned experiments.

The present invention relates to a process for regulating setting time of hydraulic cement which comprises clinker containing 5 – 60 percent by weight of $11CaO.7Al_2O_3.CaX_2$, more than 5 percent by weight of $3CaO.SiO_2$, and further $2CaO.SiO_2$ solid solution and $4CaO.Al_2O_3.Fe_2O_3$; anhydrite with or without hemihydrate; at least one selected from the group consisting of sugars, sodium hydrogen carbonate, water-soluble phosphates, (e.g., ortho phosphates, pyrophosphates, tripolyphosphates) carboxylic acids (e.g., tartaric acid, adipic acid etc.), silicofluorides, sodium silicates, ligninsulfonates, sulfuric esters of higher alcohol and alkylsulfonates, whereby the anhydrite is contained in an amount that $Al_2O_3/SO_3$ weight ratio of $Al_2O_3$ in the clinker and $SO_3$ in the anhydrite is 0.7 – 1.8 and hemihydrate is contained less than 5 percent by weight based on $SO_3$.

In the present invention, the above-mentioned additives should be used preferably in an amount of 0.01 –0.2 percent by weight for monosaccharide, 0.01 – 0.7 percent by weight for disacchardie, 0.05 – 1.00 percent by weight for polysaccharide, 0.1 – 1.5 percent by weight for sodium hydrogen carbonate; 0.1 – 2.0 percent by weight based on $P_2O_5$ for water soluble phosphates (orthophosphates, pyrophosphates and tripolyphosphates); 0.1 – 5.0 percent by weight based on F for silicofluorides (Mg-, Ca-, Na-salts), 0.1 – 5.0 percent by weight for sodium silicates; 0.03 – 3.0 percent by weight for sulfuric acid esters of higher alcohol and alkylsulfonates; and 0.01 – 1.00 percent by weight for oxyacids, e.g., tartaric acid etc. or dicarboxylic acids, e.g. adipic acid etc.

The added amount lower than one shown in the above is not effective for the setting time and the compressive strength of mortar or concrete and the added amount more than one shown in the above extremely retards the setting time and lowers the strength at the later stage as well as at the initial stage.

As has been explained above, existence of anhydrite in clinker is responsible for the initial and later high strength development of cement. Addition of anhydrite with hemihydrate in clinker is effective for increasing the initial and later strength. The added amount of hemihydrate is preferable to be 0.1 - 5.0 percent by weight based on $SO_3$ for cement and the added amount of anhydrite is most preferable to be 0.7 - 1.8 at $Al_2O_3/SO_3$ weight ratio of the amount of $Al_2O_3$ in the clinker and the amount of $SO_3$ in the anhydrite and hemihydrate in the cement. When $Al_2O_3/SO_3$ ratio is lower than 0.7, the hardened material of mortar or concrete is cracked and broken down and when $Al_2O_3/SO_3$ ratio is more than 1.8, the compressive strength of mortar or concrete decreases remarkably.

According to the present invention, the setting time of mortar which is prepared from the clinker comprising 5 - 60 percent by weight of $11CaO.7Al_2O_3 \cdot CaX_2$, more than 5 percent by weight of $3CaO.SiO_2$, $2CaO.SiO_2$, $4CaO.Al_2O_3.Fe_2O_3$ etc. is not only regulated within a range of from 7 to 40 minutes, but also the mortar or concrete provides good workability and the hardened material thereof develops excellent strength at the initial and the later stages.

Example

White clay, white bauxite, quicklime, copper slag and a small amount of gypsum as well as calcium fluoride, calcium chloride were grounded by a shaft ball mill, 85 cm in diameter and 100 cm in length, and were mixed by means of a large-sized mixer so as to obtain clinker having a composition as shown in Table 4 and the resultant mixture was shaped by a rotating roll, 60 cm in diameter. The shaped material is sintered by a small-sized rotary kiln so that free lime in the obtained clinker was lower than 0.5 percent by weight. These results are shown in Table 4.

The obtained clinker was mixed with gypsum listed in Table 5, calcium ligninsulfonate, calcium alkylsulfonate and sulfuric ester of higher alcohol, sodium hydrogen carbonate, sodium tripolyphosphate, magnesium silicofluoride, respectively, at the ratio listed by Table 6 and each thus prepared cement was tested for the setting time and compressive strength of mortar in accordance with the test method JIS R 5201. The results are summarized in Table 6. In Table 6, the setting time and the compressive strength of mortar prepared from cement which was mixed along gypsum to the above clinker were listed to compare with the above results.

Table 4

| Kind of clinker | Chemical composition (%) | | | | | | | | | Free lime | Mineral composition (%) | |
|---|---|---|---|---|---|---|---|---|---|---|---|---|
| | $SiO_2$ | $Al_2O_3$ | $Fe_2O_3$ | CaO | MgO | $SO_3$ | $Na_2O$ | $K_2O$ | Total | | $C_{11}A_7.CaX_2$ | $C_3S$ |
| A | 15.9 | 15.7 | 2.3 | 61.9 | 0.5 | 1.2 | 0.08 | 0.07 | 97.6 | 0.2 | X=F 27 | 51 |
| B | 17.8 | 15.1 | 2.0 | 61.5 | 0.4 | 1.0 | 0.03 | 0.05 | 97.9 | 0.1 | X=Cl 25 | 44 |

Note: Mineral composition was determined by means of X-ray diffraction analysis.

Table 5

| Kind of gypsum | ig.loss | $SiO_2$ | $Al_2O_3=Fe_2O_3$ | CaO | MgO | $SO_3$ | Total |
|---|---|---|---|---|---|---|---|
| Hemihydrate | 6.1 | 1.8 | 0.9 | 37.5 | 0.2 | 53.6 | 100.1 |
| Anhydrite | — | 1.9 | 1.0 | 40.0 | 0.3 | 57.2 | 100.4 |

Table 6

| Clinker | Amount of addition (% by weight) | | | Setting time of mortar (min.) | | Compressive strength of mortar (kg/cm²) | | | | | |
|---|---|---|---|---|---|---|---|---|---|---|---|
| | Anhydrite | Hemihydrate | Additive | Initial | Final | 3 hrs. | 6 hrs. | 1 day | 3 days | 7 days | 28 days |
| A 85 | 13 | 2 | - | 16 | 24 | 105 (20.4) | 124 (30.2) | 217 (48.8) | 249 (50.3) | 333 (62.5) | 450 (88.4) |
| A 85 | 15 | — | Surface active agent comprising mainly calcium ligninsulfonate 0.3* | | | 118 (25.4) | 127 (29.8) | 204 (40.4) | 308 (65.4) | 354 (70.7) | 495 (89.9) |
| A 85 | 15 | — | Sodium hydrogen carbonate 0.8* | | | 108 (24.4) | 136 (30.1) | 239 (49.5) | 288 (53.3) | 318 (68.2) | 466 (89.7) |
| A 85 | 15 | | Sodium tripolyphosphate 0.5* | | | 110 (25.3) | 126 (27.4) | 250 (55.6) | 289 (57.9) | 345 (72.4) | 453 (87.1) |
| A 84 | 12 | 2 | Magnesium silicofluoride 2.0 (based on F) | 25 | 30 | 136 (31.6) | 166 (36.5) | 262 (55.6) | 310 (60.0) | 357 (73.1) | 491 (90.6) |
| A 85 | 15 | — | Surface active agent comprising mainly sulfuric ester of higher alcohol 0.3* | 23 | 30 | 130 (30.5) | 154 (33.6) | 246 (52.3) | 276 (57.4) | 343 (71.5) | 484 (90.4) |
| B 84 | 14 | — | Magnesium silicofluoride 2.0 | 26 | 34 | 125 (25.4) | 145 (30.4) | 224 (49.9) | 275 (56.8) | 324 (62.5) | 478 (82.6) |
| A 85 | 15 | — | Surface active agent comprising mainly calcium alkylsulfonate 0.3* | 15 | 25 | 124 (27.6) | 150 (34.2) | 230 (50.9) | 293 (59.6) | 326 (69.5) | 476 (88.1) |

Note:
1) Values in parentheses show bending strength (kg/cm²)
2) Mark * shows that the compound is solved in water kneaded together with cement

What is claimed is:

1. A process for regulating the setting time of a hydraulic cement, which comprises the steps of:

admixing the retarders anhydrite and 0.01 – 1.0 weight percent of a carboxylic acid with a clinker consisting essentially of 5 – 60 weight percent of 11 $CaO.7Al_2O_3.CaX_2$, wherein X represents a halogen atom, and more than 5 weight percent of 3 $CaO.SiO_2$ solid solution, 2 $CaO.SiO_2$ solid solution and 4 $CaO.Al_2O_3.Fe_2O_3$; wherein the anhydrite is present in an amount such that the weight ratio of $Al_2O_3$ in the clinker to $SO_3$ in the anhydrite is 0.7 – 1.8.

2. A process claimed in claim 1, wherein the cement comprises anhydrite and hemihydrate.

3. A process claimed in claim 2, wherein the cement comprises less than 5 percent by weight of hemihydrate.

4. A process claimed in claim 1, wherein the cement comprises 0.01 – 1.00 percent by weight of at least one member selected from oxyacids and dicarboxylic acids.

5. A hydraulic cement composition, consisting essentially of:

5 – 60 weight percent of 11 $CaO.7Al_2O_3.CaX_2$, wherein X represents a halogen atom, more than 5 weight percent of 3 $CaO.SiO_2$ solid solution and further 2 $CaO.SiO_2$ solid solution and 4 $CaO.Al_2O_3.Fe_2O_3$; anhydrite; and 0.01 – 1.0 weight percent of a carboxylic acid, wherein the anhydrite is contained in an amount such that the $Al_2O_3/SO_3$ weight ratio of $Al_2O_3$ in the clinker and $SO_3$ in the anhydrite is 0.07 – 1.8.

6. A hydraulic cement composition as described in claim 5, wherein the cement composition comprises anhydrite and hemihydrate.

7. a hydraulic cement composition as described in claim 6, wherein the cement composition comprises hemihydrate less than 5 percent by weight.

* * * * *